July 12, 1927.

J. W. BRUNDAGE

BIAS CUTTING MACHINE

Filed June 21, 1926

Inventor:

James W. Brundage,

By Spear Middleton Donaldson & Hall
Attorneys.

July 12, 1927.
J. W. BRUNDAGE
BIAS CUTTING MACHINE
Filed June 21, 1926
1,635,531
7 Sheets-Sheet 2
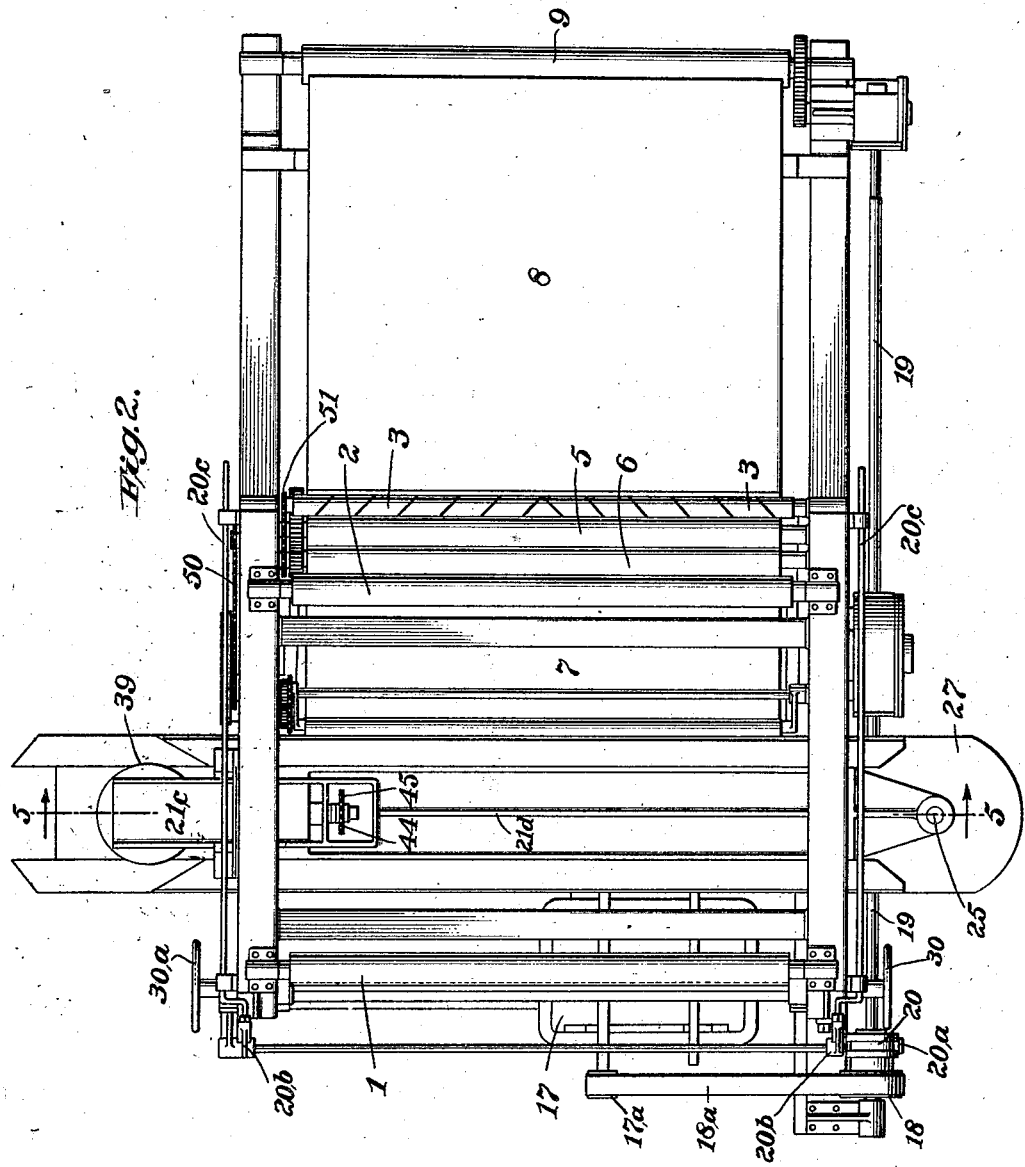
Inventor:
James W. Brundage,
By Spear, Middleton, Donaldson & Hall
Attorneys.

July 12, 1927.  1,635,531
J. W. BRUNDAGE
BIAS CUTTING MACHINE
Filed June 21, 1926   7 Sheets-Sheet 3
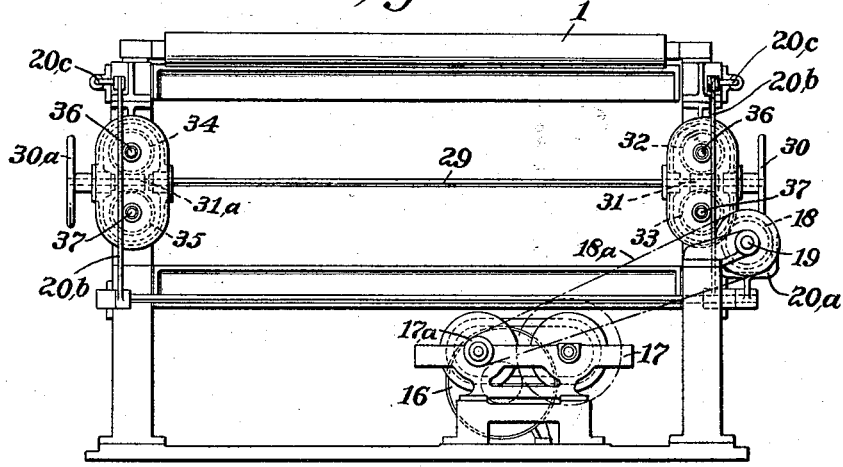
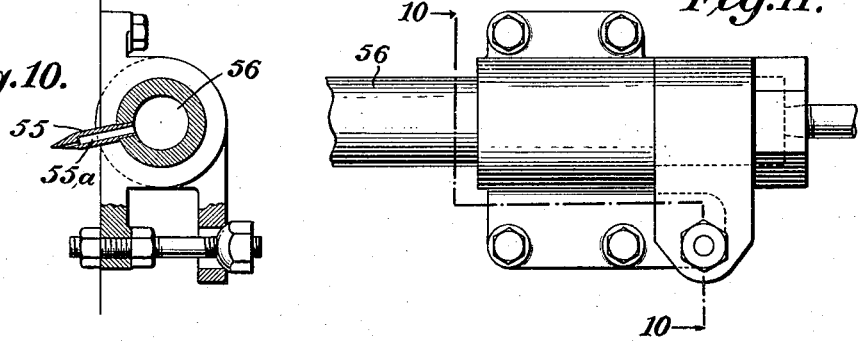
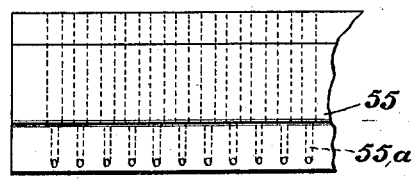
Inventor:
James W. Brundage,
By Spear, Middleton, Donaldson & Spear
Attorneys.

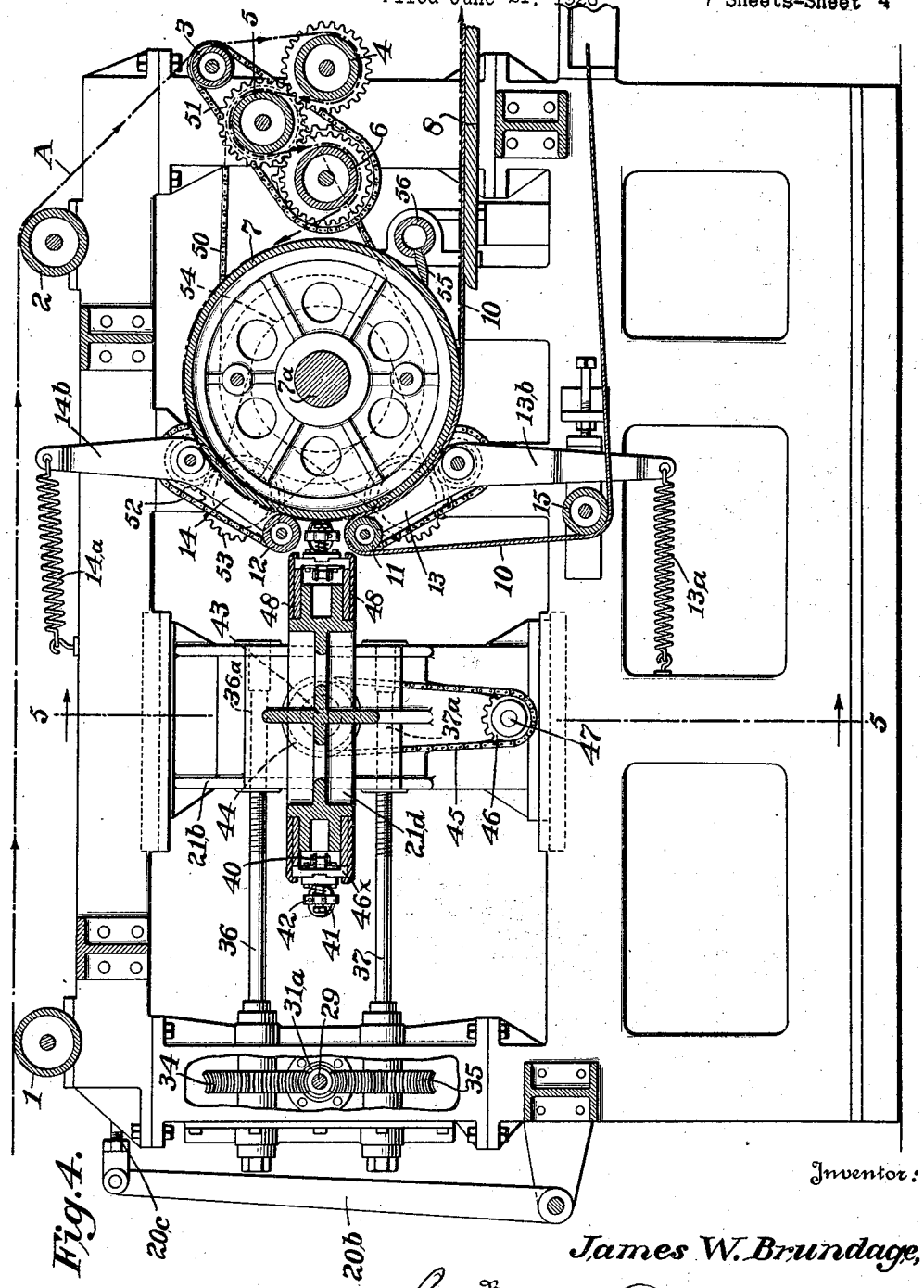

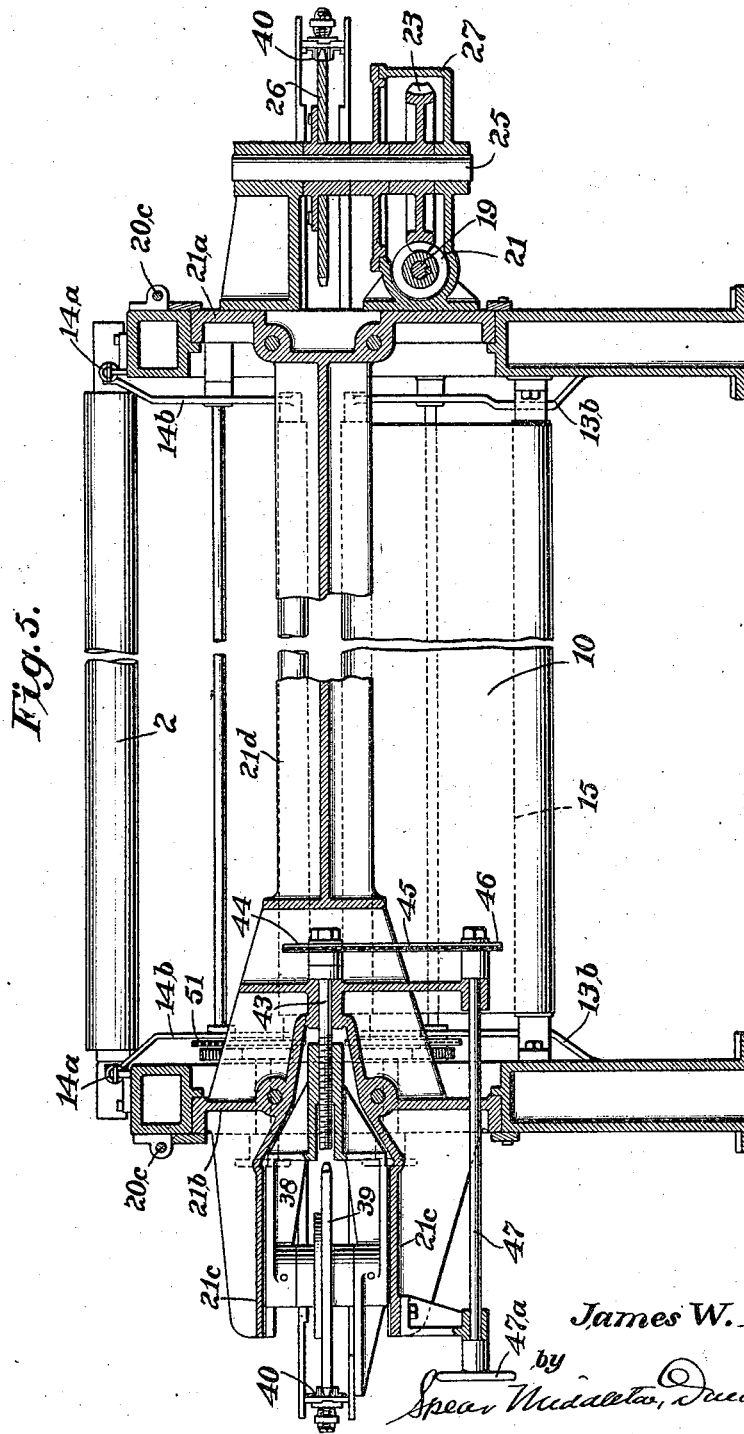

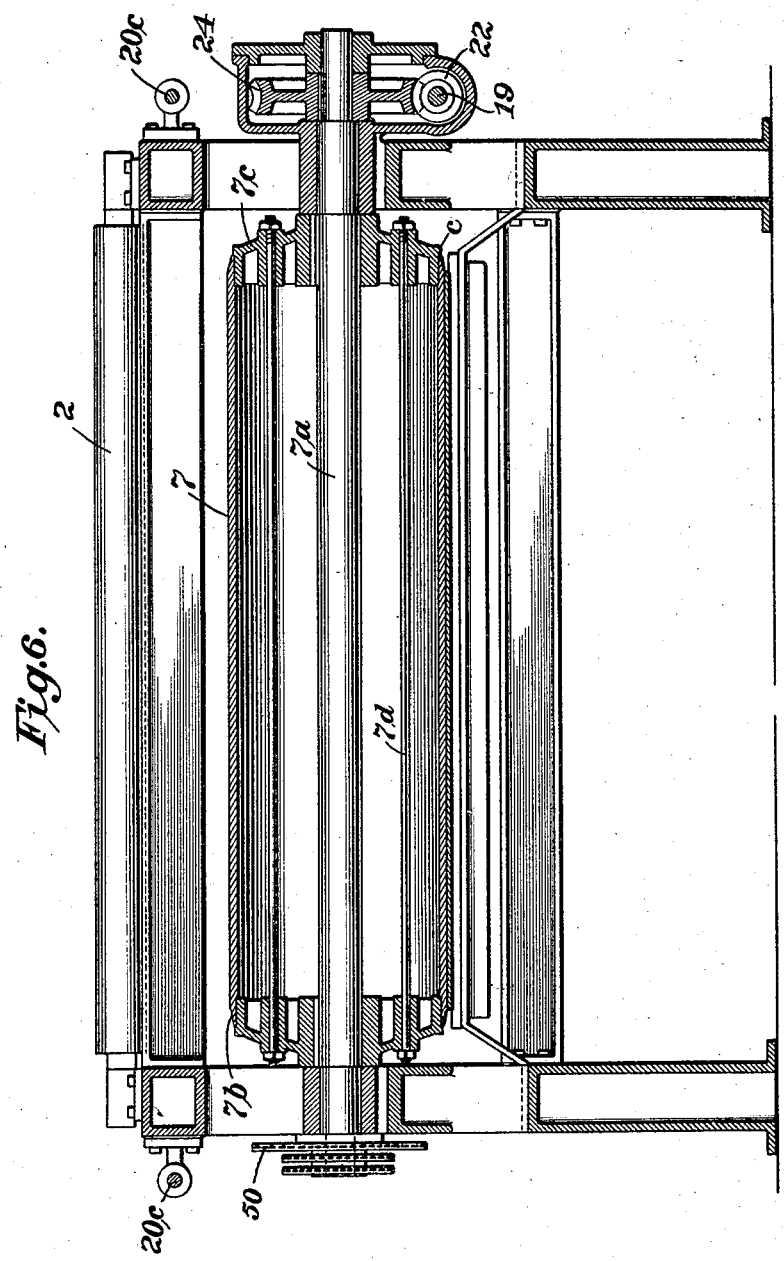

July 12, 1927.
J. W. BRUNDAGE
1,635,531
BIAS CUTTING MACHINE
Filed June 21, 1926
7 Sheets-Sheet 7
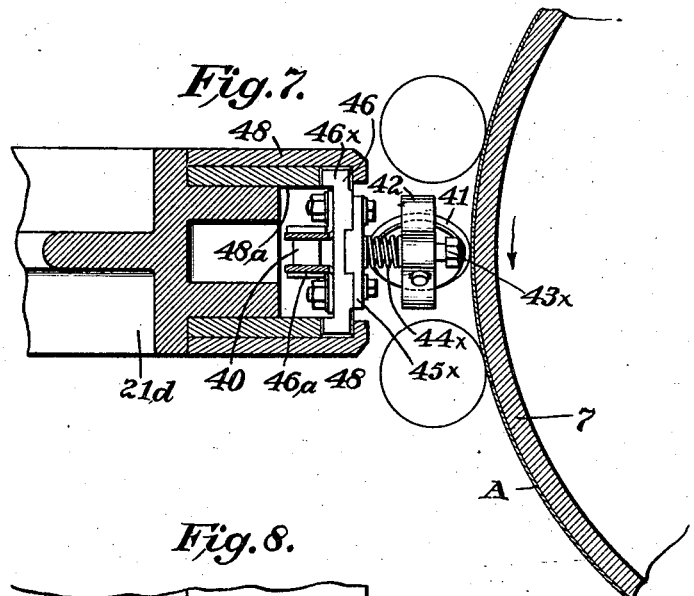
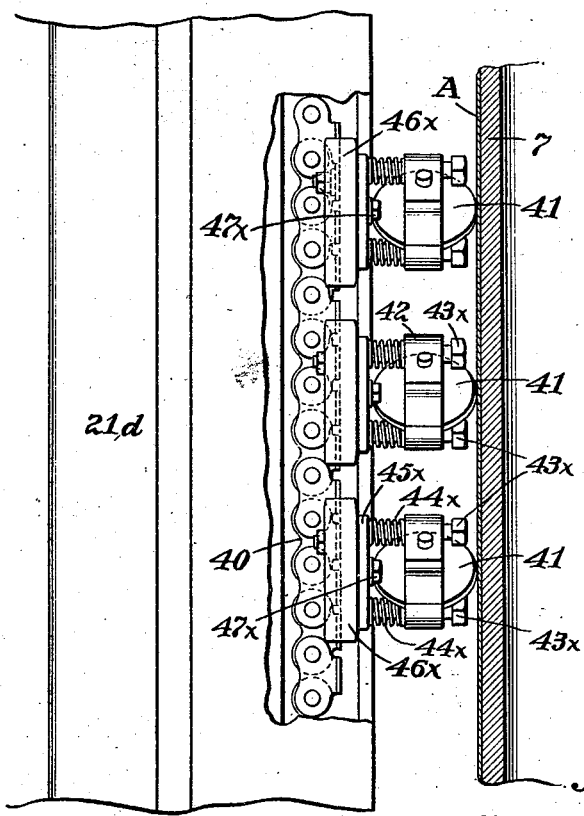
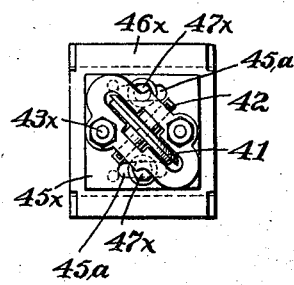
Inventor:
James W. Brundage,
By Spear, Middleton, Donaldson & Hall
Attorneys Patented July 12, 1927.

1,635,531

UNITED STATES PATENT OFFICE.

JAMES W. BRUNDAGE, OF AKRON, OHIO, ASSIGNOR TO THE MILLER RUBBER COMPANY, OF AKRON, OHIO, A CORPORATION OF OHIO.

BIAS-CUTTING MACHINE.

Application filed June 21, 1926. Serial No. 117,454.

My present invention relates to improvements in bias cutting machines of the type in which the material to be cut is led in a continuous web around a rotating platen roll and subjected to the action of an endless series of cutters moving lengthwise of the roll in synchronism therewith, the bias cuts being the component of the movement of the fabric (or platen roll) and the movement of the cutters.

The invention aims to provide various improved features of construction which will be apparent from the following description.

The invention includes the said novel features and arrangement and construction of parts hereinafter described, what I regard as constituting my present invention being set forth in and defined by the claims appended hereto.

My said invention is illustrated in the accompanying drawings in which—

Figure 2 is a plan view.

Figure 3 is an end elevation.

Figure 4 is an enlarged longitudinal vertical section with the right hand portion of the table etc. broken away.

Figure 5 is a vertical transverse section substantially on line 5—5 of Figure 2.

Figure 6 is a transverse vertical section taken on the line of the platen roll.

Figure 7 is an enlarged sectional detail showing the platen cutters and cutter guide and the presser rolls conventionally.

Figure 8 is a plan view of the same partly in section.

Figure 9 is a detail face view of one of the cutters, and

Figures 10, 11 and 12 are detail views of the scraper and blower device.

Figure 1:
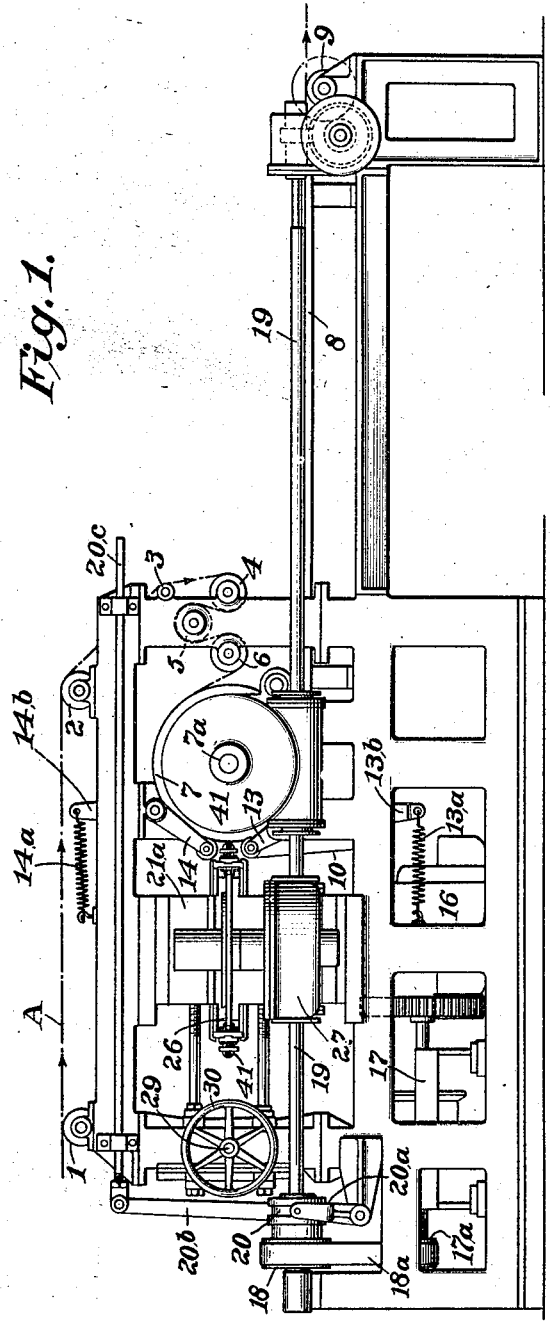
Figure 1 is a side elevation of the machine.

Referring by reference characters to these drawings the letter A designates the fabric which may be fed to the machine from any suitable source of supply, such as a stock roll (not shown), and which passes across the top of the machine. During its passage it is supported by idle rollers 1 and 2 journaled in suitable bearings on the main frame.

From the latter roll the fabric passes diagonally downward over a driven spreader roll 3 which spreads the fabric laterally and takes out any wrinkles, the spreader roll being provided, for this purpose, with helical ridges extending reversely from the center towards opposite ends as shown in Figure 2. From the spreader roll 3 the fabric passes in a zigzag path successively around driven tension rolls 4, 5 and 6, (see Figure 4). The spreader roll is driven faster than the travel of the fabric, while the tension rolls are driven at a slower speed than the fabric, by means hereinafter described. From the tension roll 6 the fabric passes to and around the platen drum 7. Roll 6 is located opposite the rear breast of the platen roll or cylinder (right-hand side Figure 4), or with its axis in substantially horizontal alinement with the axis of the platen roll or cylinder, and as the fabric leaves the platen roll at the bottom thereof this assures contact of the fabric with the platen roll for more than 135° of its circumference before it comes to the cutting point which is at the front breast of the platen roll or substantially opposite the tension roll 6.

After being cut the fabric strips pass from the bottom of the platen roll or cylinder over a table 8. A supporting belt conveyor 10 of a width not less than the width of the fabric holds the cut strips in contact with the surface of the platen roll until they reach a point directly beneath the axis of the platen roll at which point the belt conveyor leaves the platen roll and conveys the cut strips over the table to the delivery end of the machine at which point the belt passes around the roll 9.

Presser rollers 11 and 12 are provided for preventing any slipping or displacement of the fabric on either side of the cuts.

These rollers are journaled on shafts carried by lever arms 13 and 14 and are pressed towards the platen roll by springs $13^a$ and $14^a$ acting on arms $13^b$ and $14^b$.

The roll 11 is used as a support for the loop of the belt conveyor at this point, the pressure of the roll being imparted to the fabric through the belt. The return portion of the belt between rollers 9 and 11 passes around an adjustable tension roll 15 by which its tension may be regulated.

The machine is driven by a motor (electric) 16 through a variable speed drive 17 of any approved type (both being conventionally shown) power being transmitted from the latter to wheel 18 by the belt 18ª driven by pulley 17ª of the variable speed mechanism. The belt gearing above described is shown conventionally in Figure 3 and may be of any desired type as for example a flat or V belt or chain and sprocket. Wheel 18 is loose on shaft 19 and is adapted to be coupled thereto by clutch 20 preferably of the friction type operated by shifted fork 20ª through the intermediary of lever 20ᵇ and rod 20ᶜ extending to a point convenient to the operator stationed adjacent table 8.

A worm 22 keyed to shaft 19 (Figure 6) meshes with a worm gear 24 fast on the platen roll shaft 7ª and thereby drives the platen roll 7.

A second worm 21 (Figure 5) is slidably mounted on a splined portion of shaft 19 and meshes with a worm wheel 23 fast on a vertical shaft 25 which in turn carries the sprocket 26 which drives the cutter chains hereinafter more particularly described and shown in detail in Figure 8.

The vertical shaft 25, worm gear 23, and worm 21 are all carried by or mounted in a housing or carriage 27 (Figure 1) secured to a slide member or carriage 21ª slidably mounted in the frame of the machine. (See also Figure 5.)

At the opposite side of the machine is a similar sliding carriage 21ᵇ which has horizontally projecting spaced apart portions 21ᶜ which carry the idle sprocket for the cutter chain as hereinafter described.

The carriages or like members 21ª and 21ᵇ are tied together and rigidly connected by a cross member 21ᵈ which may be formed integrally therewith.

Journaled in the frame of the machine and extending transversely thereof from side to side is a shaft 29 (Figure 3) which carries fast on the extremities thereof hand wheels 30 and 30ª.

This shaft also has fast thereon worms 31 and 31ª the former of which meshes with a pair of worm wheels 32 and 33 and the latter with similar worm wheels 34 and 35.

Worm wheels 32 and 33 are fast on upper and lower shafts 36 and 37 (Figure 4) which are journaled in the machine frame so as to be held against axial movement, and worm wheels 34 and 35 are fast on similar shafts.

These four shafts have screw threaded portions which engage correspondingly threaded openings in the carriages, indicated by dotted lines at 36ª and 37ª (Figure 4).

By operating either hand wheel 30 or 30ª according to which is most convenient to the operator the carriages will be moved towards or from the platen roll according to the direction of rotation, and thus the chain cutter mechanism and carrying and driving means therefor can be moved into proximity to the platen roll to coact therewith, and may be accurately adjusted relative thereto, or it may be moved away from the platen roll a sufficient distance to permit access to the various juxtaposed parts.

The spaced apart bracket portions 21ᶜ of the carriage 21ᵇ have their opposed faces shaped to form a guide way in which is mounted a carriage 38 to have a rectilinear motion transversely of the machine. This carriage has a bifurcated portion in which is journaled the idle sprocket 39 which is in alinement with and corresponds to the drive sprocket 26 on the opposite side of the machine (Figure 5). The chain 40 to which the cutters are connected (Figure 8) passes around these two sprockets. The carriage or slide member 38 has a threaded bore which is engaged by a screw shaft 43 journaled in the frame of carriage 21ᵇ and held against axial movement therein, which shaft has fast thereon a sprocket 44 connected by chain 45 with sprocket 46 fast on shaft 47. This shaft is provided with a hand wheel 47ª by which it may be rotated and whereby the carriage 38 may be moved to adjust the tension on the belt as desired.

The cutters are indicated at 41 (Figures 7 to 9) and they are journaled in carriers 42 slidably guided on bolts or headed studs 43ˣ and normally pressed outward towards the heads by helical springs 44ˣ surrounding the studs between the carriers 42 and the plate members 45ˣ to which the studs are secured. Plate members 45ˣ are adjustably secured to carrier blocks 46ˣ by means of bolts 47ˣ passing through slots 45ª and tapped into the carrier blocks 46ˣ and these carrier blocks are slidably guided by the carriage structure 21ª, 21ᵇ, 21ᶜ heretofore described as clearly shown in Figures 4 and 7. Preferably this is accomplished by securing to said carriage structure upper and lower track members 48 Figure 4 having opposed guide grooves or channels in their overhanging opposed faces which receive the edges of the carrier blocks 46ˣ. The inner walls of the grooves may be formed by separate hardened wear plates 48ª (Figure 7).

A link belt of standard construction may be used and the carrier blocks 46ˣ secured thereto by L shaped clips 46ª bolted to the carrier blocks and having their angular portions apertured to receive the link pins of the chain.

The shaft of roll 5 is driven from the platen roll shaft by sprocket chain 50 (Figure 4) passing around suitable sprockets on the shafts of rolls 5 and 7, while rolls 4 and 6 are driven from said roll 5 by spur gears as clearly shown in said figure. Roll 3 is driven from roll 6 through sprocket chain 51.

Presser roll 12 is driven from the platen roll by sprocket gearing 52, spur gearing 53 and sprocket gearing 54, the latter being indicated in dotted lines. Presser roll 11 is driven in a similar manner as will be so clearly evident from the drawing as to render further description unnecessary.

Figure 6 shows in detail the construction of the platen roll which comprises a hollow cylindrical shell of soft steel having beveled ends $7^b$ which are supported by circular heads $7^c$ keyed to the shaft $7^a$.

The heads have slightly flared outer edges and they are drawn towards each other to bind the cylinder thereon by tie rods $7^d$. By this beveled edge arrangement as the cutters approach the end of the shell they ride up the incline thereof without damage to either.

Ordinarily the fabric will leave the platen roll at the bottom as indicated in Figure 4, but to insure its removal in case of adherence I provide a scraper bar 55 carried by a hollow bar 56 to the interior of which air under pressure is conducted from any suitable source (not shown). The scraper bar is provided with a multiplicity of passages $55^a$ (Figures 10 and 12) leading from the interior bore of bar 56 to the edge of the scraper bar and by the combined action of the said edge and air jets any adhering fabric will be removed without injury thereto.

An important feature of the present invention is the location of the endless chain of cutters at the breast of the platen roll, or midway of the height thereof, as by this arrangement the force of gravity assists the point of fabric produced by the bias cut in adhering to or lying against the face of the platen until it is engaged by the belt 10 as in rapid operation there would otherwise be a tendency for the point to double back on itself which would be seriously detrimental.

Furthermore by this arrangement the cutting is always in plain sight of the operator standing by the side of the machine.

A further important feature of the present invention is the provision for adjustment of the cutter carrier towards and from the roll to vary the pressure of the springs or to remove it clear of the platen for access for changing chains and the like.

For cutting bias strips of different widths it is necessary to increase or decrease the spacing of the cutters. In the present machine this is easily accomplished by retracting the cutter carrier, slacking up the chain, and disconnecting at the master link which may be colored for indication. The end of a chain having differently spaced cutters may then be connected to the master link and the machine drive operated sufficiently to pass the old chain out and the new chain in and after the ends of the latter have been connected the mechanism may be quickly restored to operating condition.

Having thus described my invention, what I claim is:

1. In a machine of the class described, a platen roll, means for driving the same, a carrier mounted to move towards and from the roll in a horizontal plane substantially coincident with the axis of the roll, an endless chain guided by said carrier and having spaced apart cutters, and means for driving said chain in unison with the roll.

2. In a machine of the class described, a platen roll with means for driving it, a carrier mounted to move towards and from the roll and having endless opposed guide grooves, carrier blocks having their edges guided in said grooves, an endless chain connecting said carrier blocks, means for driving said chain in unison with the platen roll, and cutters yieldably carried by said carrier blocks.

3. In a machine of the class described, a main frame, a platen roll journaled therein with means for driving it, a cutter guide slidably mounted in said frame to move towards and from the platen roll, driving and idle sprockets carried by said cutter guide, an endless chain passing around said sprockets, cutter blocks slidably guided by said guide and connected to said chain, cutters yieldably carried by said blocks, and means for moving said guide towards and from the platen.

4. In a machine of the class described, a main frame, a platen roll journaled therein with means for driving it, a cutter guide slidably mounted in said frame to move towards and from the platen roll, driving and idle sprockets carried by said cutter guide, an endless chain passing around said sprockets, cutter blocks slidably guided by said guide and connected to said chain, cutters yieldably carried by said blocks, and means for moving said guide towards and from the platen, and means for moving said idle sprocket towards and from the driving sprocket.

5. In a machine of the class described, a platen roll with means for rotating it, an endless series of spaced connected cutters arranged to operate against the breast of the roll, means for guiding the web to be cut to said roll, and presser rolls coacting with said platen roll above and below the cutters and closely adjacent thereto, and an endless conveyor belt passing around the lower presser roll and beneath the lower portion of the platen roll, and diverging from said lower portion.

6. In a machine of the class described, a platen roll with means for rotating it, an endless series of spaced connected cutters arranged to operate against the breast of the roll, means for guiding the web to be cut to said roll, and presser rolls coacting with said platen roll above and below the cutters and closely adjacent thereto, and an endless conveyor belt passing around the lower presser roller and beneath the lower portion of the platen roll, and diverging from said lower portion, and a scraper coacting with said platen roll adjacent the point of departure of the belt and having air passages leading to its edge with means for supplying air under pressure thereto.

7. In a machine of the character described, a rotatable platen roll with means for driving it, an endless series of spaced apart connected cutters disposed to operate against the breast of the roll lengthwise thereof with means for moving said cutters in unison with the rotation of the roll, a group of tension rolls adjacent the breast of the roll on the opposite side of the cutters around which the web passes in a zig zag path on its way to the platen roll, a spreader roll over which the web passes on its way to the tension rolls, and means for driving the tension rolls at a slower speed than the platen roll and the spreader roll at a faster speed.

8. In a machine of the class described, a main frame, a platen roll journaled therein, a drive shaft extending lengthwise of the frame and journaled therein, means for operating said drive shaft, gearing connecting said platen roll with said drive shaft, a carriage slidably mounted in the frame to move towards and from the breast of the platen roll, endless series of spaced connected cutters guided by said carriage and arranged to operate against the breast of the roll, means for operating said cutters including a driving wheel slidably keyed on said carriage towards and from the roll, and means for guiding a web to be cut to and around the platen roll.

In testimony whereof I affix my signature.

JAMES W. BRUNDAGE.